(12) United States Patent
Gong et al.

(10) Patent No.: US 10,897,702 B2
(45) Date of Patent: Jan. 19, 2021

(54) METHOD AND DEVICE FOR CALLING SIM CARD, METHOD AND DEVICE FOR PUSHING INFORMATION, AND SIM CARD ALLOCATION SYSTEM

(71) Applicant: SHENZHEN UCLOUDLINK NEW TECHNOLOGY CO., LTD., Shenzhen (CN)

(72) Inventors: Zhihui Gong, Shenzhen (CN); Kun Wang, Shenzhen (CN)

(73) Assignee: SHENZHEN UCLOUDLINK NEW TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/676,327

(22) Filed: Nov. 6, 2019

(65) Prior Publication Data

US 2020/0077254 A1    Mar. 5, 2020

Related U.S. Application Data

(63) Continuation-in-part of application No. PCT/CN2019/078668, filed on Mar. 19, 2019.

(30) Foreign Application Priority Data

Mar. 23, 2018   (CN) .................. 2018 1 0244188

(51) Int. Cl.
*H04W 8/18* (2009.01)
*H04W 4/60* (2018.01)
(Continued)

(52) U.S. Cl.
CPC .......... *H04W 8/183* (2013.01); *G06F 16/252* (2019.01); *H04W 4/60* (2018.02); *H04W 60/00* (2013.01); *H04W 72/04* (2013.01)

(58) Field of Classification Search
CPC ..... H04W 8/183; H04W 8/205; H04W 88/06; H04W 4/60; H04W 12/0023; H04W 4/24;
(Continued)

(56) References Cited

U.S. PATENT DOCUMENTS

2010/0311404 A1*  12/2010  Shi .................. H04W 8/205
                                                            455/419
2017/0170856 A1*  6/2017  Shen .................. H04W 12/0023
(Continued)

FOREIGN PATENT DOCUMENTS

CN     106211132 A    12/2016
CN     106375962 A     2/2017
CN     108616965 A    10/2018

*Primary Examiner* — Daniel Lai
(74) *Attorney, Agent, or Firm* — Robert L. Stearns; Dickinson Wright PLLC (57) ABSTRACT

The present disclosure provides a method and device for calling SIM card, a method and device for pushing information, and a SIM card allocation system. The method for calling SIM card is applied in a mobile terminal and includes: parsing an external network as currently searched out by the mobile terminal to generate a parsing result; reading a network information database pre-stored in the mobile terminal; and calling a target SIM card that matches with the external network to perform network registration according to the parsing result and the network information database. Due to the fact that which V-SIM card needs to be called is determined by the mobile terminal itself, the operations of continuously interacting with the server and continuously verifying the network are basically avoided, not only networking time is shortened, but also network traffic is saved, and user experience is greatly improved.

10 Claims, 4 Drawing Sheets

(51) Int. Cl.
*G06F 16/25* (2019.01)
*H04W 60/00* (2009.01)
*H04W 72/04* (2009.01)

(58) Field of Classification Search
CPC . H04W 48/18; H04W 12/00405; H04W 4/50; H04W 12/00401; H04W 60/00; H04W 8/02; H04W 8/18; H04W 12/00514; H04W 8/24; H04W 8/20; H04W 12/00403; H04W 24/02; H04W 8/245; H04W 8/265; H04W 4/00; H04W 4/02; H04W 4/025; H04W 4/029; H04W 72/04; H04W 48/16; G06F 16/252; H04L 67/26; H04M 3/42

See application file for complete search history.

(56) References Cited

U.S. PATENT DOCUMENTS

| | | | |
|---|---|---|---|
| 2017/0171736 A1* | 6/2017 | Weksler | H04W 4/24 |
| 2018/0041897 A1* | 2/2018 | Prasad | H04W 4/50 |
| 2019/0149979 A1* | 5/2019 | Xiong | H04W 4/60 |
| | | | 455/435.1 |

* cited by examiner

METHOD AND DEVICE FOR CALLING SIM CARD, METHOD AND DEVICE FOR PUSHING INFORMATION, AND SIM CARD ALLOCATION SYSTEM

CROSS REFERENCE TO RELATED APPLICATION

This application is a continuation-in-part application of PCT Patent Application Ser. No. PCT/CN2019/078668 filed on Mar. 19, 2019 which claims priority to Chinese Patent Application Ser. No. 201810244188.2 filed on Mar. 23, 2018, the entire disclosures of which are incorporated herein by reference in its entirety.

TECHNICAL FIELD

The present disclosure relates to the field of communications, and more particularly to a method and device for calling SIM card, a method and device for pushing information, and a SIM card allocation system

BACKGROUND

With the development of diversified functions of the intelligent terminal, the intelligent terminal begins to play a more and more important role in people's daily life.

In the prior art, the most common approach is that people inserts a physical SIM (Subscriber Identity Module) card into a mobile terminal so as to achieve daily data services such as making a call, surfing the internet and the like; however, with the development of science and technology, defects of the physical SIM card are gradually revealed, for example, the physical SIM card is not prone to be replaced, and a great many of wasted physical SIM cards do not meet the requirement of resource saving, for this reason, technical innovation of V-SIM (Virtual Subscriber Identity Module) card is expedited.

The term of V-SIM is an abbreviation of Virtual Subscriber Identity Module, which belongs to remote SIM card technology, the SIM card is stored in a remote server, an intelligent terminal remotely uses the SIM card in the server through software technology, this is why the V-SIM is called as Virtual SIM. The SIM card stored in the remote server may be one or a plurality of physical SIM cards inserted in a SIM card pool, and may also be a software SIM card stored in the server. If the V-SIM is a physical SIM card, a mirror of the SIM card information in the remote server is usually downloaded partially into the terminal locally, only when the terminal uses this SIM card to complete authentication of the carrier network, the carrier's authentication request needs to be relayed to the remote server in order to complete the authentication, and the remote server returns the result of authentication to the terminal. However, if the server stores soft SIM card, the soft SIM card is directly downloaded into the terminal to be used, the authentication of carrier network is completed in the soft SIM card locally.

The traditional V-SIM card may be replaced at any time and provide a user with cheap charge (especially in foreign roaming) and excellent internet surfing experience (e.g., the SIM card is replaced when being within a poor network). Where, when surfing the internet is required, the mobile terminal may request for allocation of V-SIM card from the server each time, and then use the V-SIM card to perform network registration. if the V-SIM card is rejected by the target network, information of rejection is fed back to the server, and a new V-SIM card is allocated by the server again, the aforesaid process is repeatedly performed until the mobile terminal is allocated with a V-SIM card that may perform network registration successfully. Therefore, as described above, in order to allocate the virtual card that matches with the target network to the mobile terminal, a complicated data communication process between the server and the mobile terminal always need to be performed, and thus excessive and unnecessary network traffic of the user must be wasted, not only expensive cost of network traffic is brought to the user, but also longer networking time is caused, and the user must wait, which causes the user experience to be extremely poor.

SUMMARY

The present disclosure provides a method for calling SIM card, in which method the historical network information database in the server is downloaded into the mobile terminal, and the target SIM card is selected by the mobile terminal, the implementation of this method aims at solving the problem in the prior art that when the V-SIM card is used by the mobile terminal to realize data service, information interaction (e.g., including SIM card allocation, feedback of network registration result, and the like) between the server and the mobile terminal always needs to be performed many times if the V-SIM card allocated by the server fails to meet the requirement of the network to be connected, such that longer time is wasted and higher data traffic charge is spent and the user experience is poor, when the network is registered by the mobile terminal.

The present disclosure is implemented by providing a method performed on a mobile terminal for calling SIM card, including the steps of:

parsing, by the mobile terminal, an external network as currently searched out by the mobile terminal and generating a parsing result by the mobile terminal;

reading, by the mobile terminal, a network information database pre-stored in the mobile terminal; and calling, by the mobile terminal, a target SIM card that matches with the external network to perform network registration according to the parsing result and the network information database.

The present disclosure further provides a method performed on a server for pushing information, including the steps of:

receiving, by the server, current network access data uploaded by a mobile terminal;

parsing and processing the current network access data to generate a network information database by the server; and pushing, by the server, the network information database to the mobile terminal in order that the mobile terminal calls the target SIM card that matches with the external network to perform network registration according to the network information database.

The present disclosure further provides a server for pushing information, including:

a second processor; and a second memory configured to store computer program executable on the processor;

where the second processor is configured to execute the computer program in the second memory to implement the steps of:

receiving current network access data uploaded by a mobile terminal;

parsing and processing the current network access data to generate a network information database; and pushing the network information database to the mobile terminal in order that the mobile terminal calls the target SIM card that matches with the external network to perform network registration according to the network information database.

The present disclosure further provides a SIM card allocation system based on massive data analysis, including:

an intelligent terminal configured to parse a currently searched external network and generate a parsing result; to read a network information database pre-stored in the intelligent terminal; and to call a target SIM card that matches with the external network to perform network registration according to the parsing result and the network information database; and a server configured to receive current network access data uploaded by the intelligent terminal; and to parse and process the current network access data so as to generate a network information database and push the network information database to the mobile terminal in order that the mobile terminal calls the target SIM card that matches with the external network to perform network registration according to the network information database.

As described above, the method for calling SIM card provided by the embodiment of the present disclosure is applied in a mobile terminal, the network information database is stored in the mobile terminal, and the network information database contains the network information which is generated according to the historical networking data of the mobile terminal, when an external network is searched by the mobile terminal, the V-SIM card that matches with the external network currently may be determined and is directly called, in this way, a problem that time and network traffic are wasted because that a V-SIM card allocation is requested by interacting with the server for many times and whether the network is successfully connected is verified for many times in the traditional SIM card calling mode is avoided. According to the method for calling SIM card provided by the embodiment of the present disclosure, due to the fact that which V-SIM card needs to be called is determined by the mobile terminal itself, the operations of continuously interacting with the server and continuously verifying the network are basically avoided, not only networking time is greatly shortened, the network traffic is also saved, so that the user experience is greatly improved.

BRIEF DESCRIPTION OF THE DRAWINGS

Other advantages of the embodiments of present invention will be readily appreciated, as same becomes better understood by reference to the following detailed description when considered in connection with the accompanying drawings wherein.

DESCRIPTION OF THE ENABLING EMBODIMENT

In order to make the objective, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

A method for calling SIM (Subscriber Identity Module) card provided by the embodiment of the present disclosure is applied in a mobile terminal, and a network information database is stored in the mobile terminal, the network information database includes network information which is generated according to historical networking data of the mobile terminal, when an external network is searched by the mobile terminal, which V-SIM card matches with the external network may be determined by the mobile terminal itself according to the network information stored in the network information database, and the V-SIM card that matches with the external network is called directly; in this way, a problem that time and network traffic are wasted due to frequent interactions between the mobile terminal and the server is avoided.

Embodiment One

Figure 1:
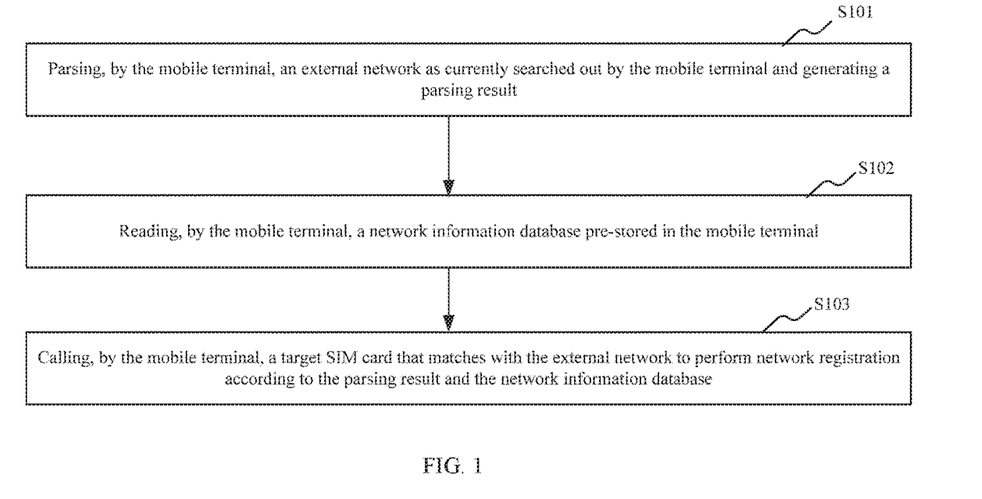
FIG. 1 depicts a schematic flow diagram of a method for calling SIM card performed on a mobile terminal according to a first embodiment of the present disclosure.

FIG. 1 depicts a schematic flow diagram of a method for calling SIM card performed on a mobile terminal according to this embodiment of the present disclosure, the method for calling SIM card includes:

Step 101, parsing, by the mobile terminal, an external network as currently searched out by a mobile terminal and generating a parsing result.

In this embodiment of the present disclosure, the mobile terminal is explained by taking mobile phone as the example, when the mobile phone is powered on, the network searching function is started, so that a network (i.e., the external network) within a preset range of the mobile phone may be searched. After the external network is searched by the mobile phone, when a network needs to be accessed, this network is parsed, the parsing process of the network is for the purpose of acquiring some basic information of the network such as a carrier, a frequency band where the network is located, a frequency point, and a charge condition and the like, these parsed information is contained in the parsing result.

Step 102, reading a network information database pre-stored in the mobile terminal by the mobile terminal.

Step 103, calling, by the mobile terminal, a target SIM card that matches with the external network according to the parsing result and the network information database to perform network registration.

In this embodiment of the present disclosure, the network information database is stored in the mobile phone, and basic information (i.e., the carrier of the network, the frequency band, the frequency point and the like as mentioned above) of some preset networks and the V-SIM cards which are optimally matched with the basic information are stored in the network information database. In case that the V-SIM card is a physical SIM card (or a hard card) of a remote server, in this case, the network information database stores the basic information of the V-SIM card that excludes authentication in the remote server, which means that performing authentication by communicating with the server is still necessary when the V-SIM card is used to perform network registration.

The mobile terminal is configured to read the aforesaid network information database and determine which V-SIM (V-SIM) card needs to be used for performing network registration currently according to some basic information of these networks. The mobile phone may either directly call the SIM card stored in the network information database or call the SIM card from the server remotely.

As described above, the method for calling SIM card provided by the embodiment of the present disclosure is applied in a mobile terminal, when an external network is searched by the mobile terminal, the V-SIM card that matches with the external network currently may be determined and is directly called, in this way, a problem that time and network traffic are wasted because that V-SIM card allocation is requested by interacting with the server for many times and whether the network is successfully connected is verified for many times in the traditional SIM card calling mode is avoided. According to the method for calling SIM card provided by the embodiment of the present disclosure, due to the fact that which V-SIM card needs to be called is determined by the mobile terminal itself, the operations of continuously interacting with the server and continuously verifying the network are basically avoided, not only networking time is greatly shortened, the network traffic is also saved, so that the user experience is greatly improved.

Embodiment Two

Figure 2:
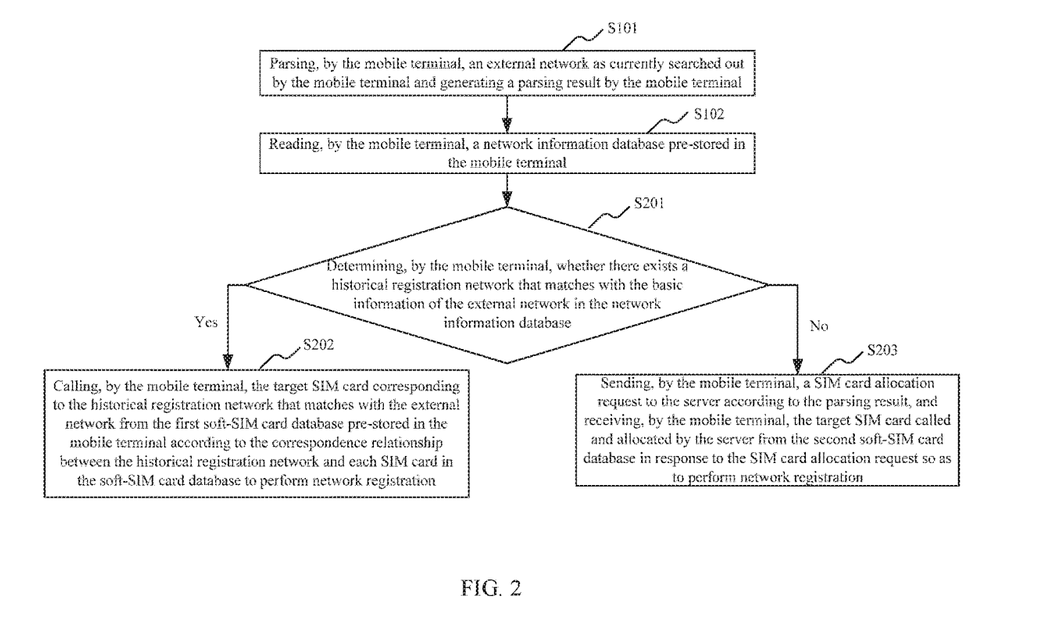
FIG. 2 depicts a schematic flow diagram of a method for calling SIM card performed on the mobile terminal according to a second embodiment of the present disclosure.

As shown in FIG. 2, the flow diagram of the method for calling SIM card provided by this embodiment of the present disclosure differs from that of the method for calling SIM card in the first embodiment in that:

The step 103 is replaced with calling, by the mobile terminal, the target SIM card that matches with the external network from a first V-SIM card database pre-stored in the mobile terminal or from a second V-SIM card database in the server to perform network registration according to the parsing result and the network information database.

In this embodiment of the present disclosure, the V-SIM card which is called by the mobile terminal may come from the first V-SIM card database stored in the mobile terminal itself, when it fails to search a V-SIM card that matches with the currently searched external network in the first V-SIM card database of the mobile terminal, the V-SIM card is called from the second V-SIM card database in the server.

Further, step 103 particularly includes:

step 201, determining, by the mobile terminal, whether there exists a historical registration network that matches with basic information of the external network in the network information database;

step 202, calling, by the mobile terminal, the target SIM card corresponding to the historical registration network that matches with the external network from the first V-SIM card database pre-stored in the mobile terminal according to the correspondence relationship between the historical registration network and each SIM card in the V-SIM card database to perform network registration, if the determination is that there exists a historical registration network that matches with basic information of the external network in the network information database; and step 203, sending, by the mobile terminal, a SIM card allocation request to the server according to the parsing result, and receiving, by the mobile terminal, the target SIM card called and allocated by the server from the second V-SIM card database in response to the SIM card allocation request to perform network registration, if the determination is that there doesn't exist the historical registration network that matches with basic information of the external network in the network information database.

In this embodiment of the present disclosure, the aforesaid parsing result is the basic information of the external network which at least includes frequency band information or frequency point information of the external network and position information corresponding to the external network. The aforesaid network information database at least includes the basic information of one or a plurality of historical registration networks and the correspondence relationship between the historical registration network and each SIM card stored in the first V-SIM card database of the mobile terminal; and the basic information of the historical registration network at least includes the frequency band information or the frequency point information of the external network and the position information corresponding to the external network.

In this embodiment of the present disclosure, data source of the network information database stored in the mobile terminal is mainly acquired by two approaches as follows:

In the first approach, the network information database is written into the mobile terminal in a manufacturing process of the mobile terminal, and the network information database may be taken as the basis from which the mobile terminal calls a V-SIM card in a subsequent use process of the mobile terminal.

Another approach is pushing through a server. In this approach, a traditional approach of requesting the server to allocate a V-SIM card is adopted by the mobile terminal when the network information database allocated by the server hasn't been stored in the mobile terminal, moreover, after one V-SIM card is received by the mobile terminal each time, result information of network registration is uploaded by the mobile terminal to the server to be stored and processed. Particularly, for example, a card A used for register a network X is allocated to the mobile terminal, and the result is failure, information including the geographic position, the frequency band, the frequency point (i.e., the basic information of the historical registration network) corresponding to the network X, the registration result (failure in this example), a failure reason, and which V-SIM card fails to match with the network X is uploaded to the server, the server stores the information which is generated when the V-SIM card allocated at this time is used to perform network registration, and the stored information is prepared for subsequent processing; in another aspect, if network registration is successfully performed through the V-SIM card allocated at this time, the V-SIM card is stored in the mobile terminal too, and the information indicative of successful network registration is further uploaded to the server.

If the approach of requesting the server to allocate the V-SIM card as described above lasts for a preset time (e.g., one month), at least one V-SIM card has been stored in the mobile terminal, and the aforesaid first V-SIM card database is generated, moreover, the server has also stored network registration data of the mobile terminal many times, the currently accumulated data is deemed to be more stable, the basic use habit (which may include frequently connected networks, information of V-SIM cards matching with these networks respectively, and the like) of the mobile terminal is met; then, the accumulated basic information of the plurality of historical registration networks of the mobile terminal is sorted and parsed by the server, and the optimal network information database is generated and pushed to the mobile terminal, so that when an external network is searched by the mobile terminal next time, the information in the network information database may be read by the mobile terminal, and the V-SIM card that matches with the currently searched external network is called by the mobile terminal to perform network registration.

The specific flow diagram of the method for calling SIM card provided by this embodiment of the present disclosure is described in detail below:

In this embodiment of the present disclosure, for example, a network information database is stored in a mobile terminal, the network information database at least includes basic information of the first historical registration network, the second historical registration network and the third historical registration network, and the correspondence relationship between these three networks and V-SIM cards; for example, the first historical registration network, the second historical registration network and the third historical registration network correspond to the V-SIM card A, the V-SIM card B and the V-SIM card C respectively. Meanwhile, the mobile terminal further stores a first V-SIM card database which includes the V-SIM card A, the V-SIM card B and the V-SIM card C. When an external network is searched by the mobile terminal, the external network is parsed and a parsing result is acquired, the parsing result at least includes a frequency band or a frequency point of the external network and the position information corresponding to the external network. Due to the fact that the basic information of the first historical registration network, the second historical registration network and the third historical registration network is stored in the network information database, the parsing result of the external network is compared with the basic information of the first historical registration network, the second historical registration network and the third historical registration network, if the external network is found to be consistent with the basic information of the first historical registration network in the network information database, the searched external network and the first historical registration network are considered as the same network, then, the V-SIM card A corresponding to the first historical registration network is called to perform network registration.

Due to the fact that the server has performed long-time data accumulation, as for a mobile terminal, generally speaking, geographic positions reached by the mobile terminal are relatively stabilized, so that the networks connected by the mobile terminal are kept stable substantially, thus, the accuracy of the aforesaid data accumulation is guaranteed; when the mobile terminal reaches a place and searches the network locally, an appropriate V-SIM card may be called according to the network information database and the first V-SIM card database.

In another case, when the basic information of the external network as currently searched out by the mobile terminal is inconsistent with the basic information of all networks in the network information database, which means that, the external network searched by the mobile terminal is a new network searched by the mobile terminal, there is no historical registration data, the mobile terminal may fail to find a V-SIM card that matches with the currently searched external network in the first V-SIM card database thereof, so that the mobile terminal needs to send a SIM card allocation request to the server, then, the server will call a V-SIM card from its own second V-SIM card database and allocate the V-SIM card to the mobile terminal. At this time, the mobile terminal also needs to continuously verify whether the V-SIM card allocated by the server may perform network registration successfully. After the data is stable, the information in the network information database may be updated again and pushed to the mobile terminal; in this way, when the mobile terminal searches the external network next time, a V-SIM card that matches with the external network may be called from the mobile terminal's own first V-SIM card database. In use process of the mobile terminal, the aforesaid update mode is continuously performed and the integrity and the accuracy of the network information database are guaranteed.

In one preferable embodiment of the present disclosure, on the premise that the aforesaid V-SIM card that matches with the historical registration network in the network information database is ensured to be successfully registered in the network, the matching mode with the fastest network speed and the most stable network connection is selected, such that the user experience may be improved. In another preferable embodiment of the present disclosure, the basic information of each historical registration network in the network information database further include charge information and the like, the matched V-SIM card may be a V-SIM card with the most reasonable charge on the basis of ensuring that network registration is normally performed, so that the user experience is further improved.

The method for calling SIM card provided by the embodiment of the present disclosure is applied in a mobile terminal which stores a network information database, and the network information database includes network information generated according to the historical network connection data of the mobile terminal, when an external network is searched by the mobile terminal, which V-SIM card that matches with the external network currently may be determined according to the network information stored in the network information database, and the V-SIM card that matches with external network is directly called, so that a problem that time and network traffic are wasted because that V-SIM card allocation is requested by interacting with the server for many times and whether the network is successfully connected is verified for many times in the traditional SIM card calling mode is avoided. According to the method for calling SIM card provided by the embodiment of the present disclosure, due to the fact that which V-SIM card needs to be called is determined by the mobile terminal itself, the operations of continuously interacting with the server and continuously verifying the network are basically avoided, not only the networking time is greatly shortened, the network traffic is also saved, and the user experience is greatly improved.

Embodiment Three

Figure 3:
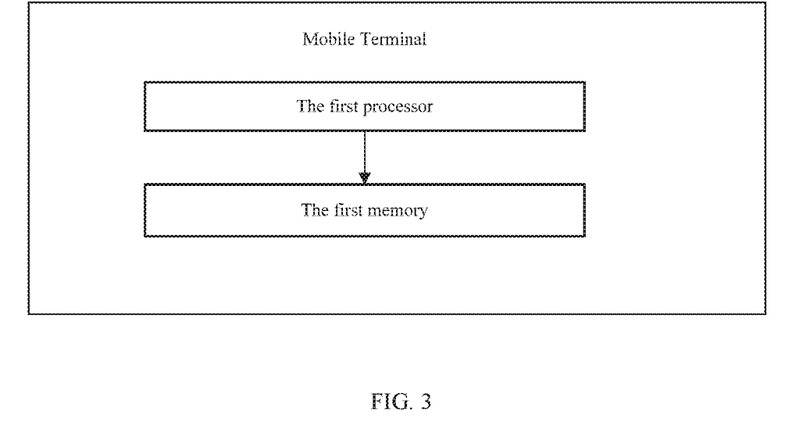
FIG. 3 depicts a schematic structural diagram of a device for calling SIM card performed on the mobile terminal according to a third embodiment of the present disclosure.

FIG. 3 depicts a schematic structural diagram of a device for calling SIM card according to an embodiment of the present disclosure, the device for calling SIM card includes:

a first processor, which may be CPU, or be ASIC (Application Specific Integrated Circuit), or be one or a plurality of integrated circuits configured to implement the present disclosure; and a first memory configured to store computer program, the second memory may include a RAM, and may also include a non-volatile memory such as a magnetic disc storage.

Figure 4:
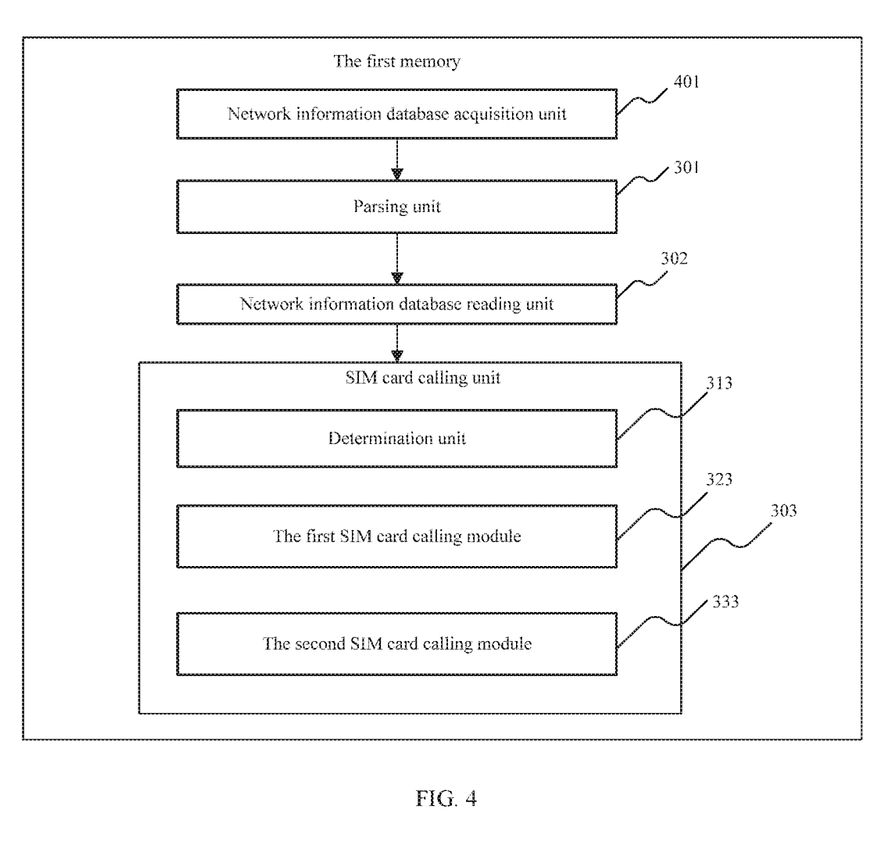
FIG. 4 depicts a schematic structural diagram of a device for calling SIM card performed on the mobile terminal according to a fourth embodiment of the present disclosure.

Particularly, as shown in FIG. 4, the computer program includes:

a parser unit 301, which is configured to parse an external network as currently searched out by the mobile terminal and generating a parsing result.

In this embodiment of the present disclosure, the mobile terminal is explained by taking mobile phone as the example, when the mobile phone is powered on, the network searching function is started, so that a network (i.e., the external network) within a preset range of the mobile phone may be searched. After the external network is searched by the mobile phone, when a network needs to be accessed, this network is parsed, the parsing process of the network is for the purpose of acquiring some basic information of the network such as a carrier of the network, a frequency band where the network is located, a frequency point, a charge condition and the like, these parsed information is contained in the parsing result.

The computer program further includes:

a network information database reading unit 302, which is configured to read a network information database pre-stored in the mobile terminal; and a SIM card calling unit 303, which is configured to call a target SIM card that matches with the external network according to the parsing result and the network information database to perform network registration.

The first processor is configured to execute the computer program stored in the first memory to parse an external network as currently searched out by the mobile terminal and generate a parsing result; to read a network information database pre-stored in the mobile terminal; and to call a target SIM card that matches with the external network to perform network registration according to the parsing result and the network information database.

The first processor is particularly configured to execute the computer program stored in the first memory to call the target SIM card that matches with the external network from a first V-SIM card database pre-stored in the mobile terminal or from a second V-SIM card database in a server to perform network registration, according to the parsing result and the network information database.

The first processor is further configured to execute the computer program stored in the first memory to upload current network access data of the mobile terminal to the server, and receive the network information database generated and allocated by the server according to analysis and processing of the historical network access data.

Furthermore, the first processor is particularly configured to execute the computer program stored in the first memory to determine whether there exists a historical registration network that matches with the basic information of the external network in the network information database.

The first processor is further configured to execute the computer program stored in the first memory to call the target SIM card corresponding to the historical registration network that matches with the external network from the first V-SIM card database pre-stored in the mobile terminal according to the correspondence relationship between the historical registration network and each SIM card in the V-SIM card database to perform network registration, if the determination module determines that there exists a historical registration network that matches with the basic information of the external network in the network information database.

The first processor is further configured to execute the computer program stored in the first memory to send a SIM card allocation request to the server according to the parsing result, and receive the target SIM card called and allocated by the server from the second V-SIM card database in response to the SIM card allocation request to perform network registration, if the determination module determines that there doesn't exist a historical registration network that matches with the basic information of the external network in the network information database.

Furthermore, the first processor is particularly configured to execute the computer program stored in the first memory to determine whether there exists a historical registration network that matches with one or any combination of the frequency band information and the frequency point information of the external network and the position information corresponding to the external network in the network information database.

In this embodiment of the present disclosure, the network information database is stored in the mobile phone, and basic information of some preset networks (i.e., the carrier of the network, the frequency band, the frequency point and the like as mentioned above) and the V-SIM cards which are optimally matched with the basic information are stored in the network information database.

The mobile terminal is configured to read the aforesaid network information database and determine which V-SIM card needs to be used currently for performing network registration according to some basic information of these networks. The process of determining which SIM card is currently used is performed on the mobile phone, directly calling the SIM card may be performed by the mobile phone or by a server.

Therefore, the method for calling SIM card provided by the embodiment of the present disclosure is applied in a mobile terminal, the network information database is stored in the mobile terminal, and the network information database contains the network information which is generated according to the historical networking data of the mobile terminal, when an external network is searched by the mobile terminal, the V-SIM card that currently matches with the external network may be determined and directly called, in this way, a problem that time and network traffic are wasted because that a SIM card allocation is required through interacting with the server for many times, and verification of determining whether the network is successfully connected is performed for many times in the traditional SIM card calling mode is avoided. According to the method for calling SIM card provided by the embodiment of the present disclosure, due to the fact that which V-SIM card needs to be called is determined by the mobile terminal itself, continuous interaction between the mobile terminal with the server and continuous network verification are basically avoided, not only networking time is greatly shortened, the network traffic is also saved, and the user experience is greatly improved.

Embodiment Four

As shown in FIG. 4, the device for calling SIM card provided in embodiment four of the present disclosure differs from the device for calling SIM card provided in embodiment three in that:

The first processor is particularly configured to execute the computer program stored in the first memory to call the target SIM card that matches with the external network from a first V-SIM card database pre-stored in the mobile terminal or from a second V-SIM card database in the server to perform network registration according to the parsing result and the network information database.

In this embodiment of the present disclosure, the V-SIM card which may be called by the mobile terminal may come from the first V-SIM card database stored in the mobile terminal itself, when it fails to search a V-SIM card that matches with the currently searched external network in the first V-SIM card database of the mobile terminal, the V-SIM card is called from the second V-SIM card database in the server.

Furthermore, as shown in FIG. 4, the computer program includes the SIM card calling unit 303, and the SIM card calling unit 303 particularly includes:

a determination module 313, which is configured to determine whether there exists a historical registration network that matches with basic information of the external network in the network information database;

a first SIM card calling module 323, which is configured to call the target SIM card corresponding to the historical registration network that matches with the external network from the first V-SIM card database pre-stored in the mobile terminal to perform network registration, according to the correspondence relationship between the historical registration network and each SIM card in the V-SIM card database, if it is determined that there exists a historical registration network that matches with basic information of the external network in the network information database; and a second card calling module 333, which is configured to send a SIM card allocation request to the server according to the parsing result, and to receive the target SIM card called and allocated by the server from the second V-SIM card database in response to the SIM card allocation request to perform network registration, if it is determined that there doesn't exist the historical registration network that matches with basic information of the external network in the network information database.

The first processor is particularly configured to execute the computer program stored in the first memory to determine whether there exists a historical registration network that matches with basic information of the external network in the network information database; and to call the target SIM card corresponding to the historical registration network that matches with the external network from the first V-SIM card database pre-stored in the mobile terminal to perform network registration according to the correspondence relationship between the historical registration network and each SIM card in the V-SIM card database, if it is determined that there exists a historical registration network that matches with basic information of the external network in the network information database.

As an alternative, the first processor is particularly configured to execute the computer program stored in the first memory to send a SIM card allocation request to the server according to the parsing result, and receive the target SIM card called and allocated by the server from the second V-SIM card database in response to the SIM card allocation request to perform network registration, if it is determined that there doesn't exist the historical registration network that matches with basic information of the external network in the network information database.

In this embodiment of the present disclosure, the aforesaid parsing result is the basic information of the external network which at least includes frequency band information or frequency point information of the external network and position information corresponding to the external network. The aforesaid network information database at least includes the basic information of one or a plurality of historical registration networks and the correspondence relationship between the historical registration network and each SIM card stored in the first V-SIM card database of the mobile terminal; and the basic information of the historical registration network at least includes the frequency band information or the frequency point information of the external network and the position information corresponding to the external network.

In this embodiment of the present disclosure, data source of the network information database stored in the mobile terminal is mainly acquired by two approaches as follows:

In the first approach, the network information database is written into the mobile terminal in a manufacturing process of the mobile terminal, and the network information database may be taken as the basis from which the mobile terminal calls a V-SIM card in a subsequent use process of the mobile terminal.

Another approach is pushing through a server. The device for calling SIM card further includes a network information acquisition unit 401 configured to upload the current network access data to the server and receive the network information database generated and allocated by the server according to parsing and processing of the current network access data.

A traditional approach of continuously requesting the server to allocate a V-SIM card is adopted by the mobile terminal when the network information database which is allocated by the server hasn't been stored in the mobile terminal, moreover, after a V-SIM card is received by the mobile terminal each time, result information of network registration is uploaded by the mobile terminal to the server to be stored and processed. Particularly, for example, a card A used for register a network X is allocated to the mobile terminal, and the result is failure, the information including the geographic position, the frequency band, the frequency point (i.e., the basic information of the historical registration network) corresponding to the network X, the registration result (it is failure in this example), a reason of failure, and which V-SIM card fails to match with the network X is uploaded to the server, the server stores the information which is generated when the V-SIM card allocated at this time is used to perform network registration, and the stored information is prepared for subsequent processing; in another aspect, if network registration is successfully performed through the V-SIM card allocated at this time, the V-SIM card is stored in the mobile terminal too, and the information indicative of successful network registration is further uploaded to the server.

If the approach of requesting the server to allocate the V-SIM card as described above lasts for a preset time (e.g., one month), at least one V-SIM card has been stored in the mobile terminal, and the aforesaid first V-SIM card database is generated, moreover, the server has also stored network registration data of the mobile terminal many times, the currently accumulated data is deemed to be more stable, the basic use habit (which may include frequently connected networks, the information of V-SIM cards matching with these networks respectively, and the like) of the mobile terminal is met; then, the accumulated basic information of the plurality of historical registration networks of the mobile terminal is sorted and parsed by the server, and the network information database is generated and pushed to the mobile terminal, so that when an external network is searched by the mobile terminal next time, the information in the network information database may be read by the mobile terminal, and the V-SIM card that matches with the currently searched external network is called by the mobile terminal to perform network registration.

In this embodiment of the present disclosure, for example, a network information database is stored in a mobile terminal, the network information database at least includes basic information of the first historical registration network, the second historical registration network and the third historical registration network, and the correspondence relationship between these three networks and V-SIM cards, for example, the first historical registration network, the second historical registration network and the third historical registration network correspond to the V-SIM card A, the V-SIM card B and the V-SIM card C, respectively. Meanwhile, the mobile terminal further stores a first V-SIM card database which includes the V-SIM card A, the V-SIM card B and the V-SIM card C. When an external network is searched by the mobile terminal, the external network is parsed and a parsing result is acquired, the parsing result at least includes a frequency band or a frequency point of the external network and the position information corresponding to the external network. Due to the fact that the basic information of the first historical registration network, the second historical registration network and the third historical registration network is stored in the network information database, the parsing result of the external network is compared with the basic information of the first historical registration network, the second historical registration network and the third historical registration network, if the external network is found to be consistent with the basic information of the first historical registration network in the network information database, the searched external network and the first historical registration network are considered as the same network, then, the V-SIM card A corresponding to the first historical registration network is called to perform network registration.

Due to the fact that the server has performed long-time data accumulation, as for a mobile terminal, generally speaking, geographic positions reached by the mobile terminal are relatively stabilized, so that the networks connected by the mobile terminal are kept stable substantially, and thus the accuracy of the aforesaid data accumulation is guaranteed; when the mobile terminal reaches a place and searches the network locally, an appropriate V-SIM card may be called according to the network information database and the first V-SIM card database.

In another case, when the basic information of the external network as currently searched out by the mobile terminal is inconsistent with the basic information of all networks in the network information database, which means that, the external network searched by the mobile terminal is a new network searched by the mobile terminal, there is no historical registration data, the mobile terminal may fail to find a V-SIM card that matches with the currently searched external network in the first V-SIM card database thereof, so that the mobile terminal needs to send a SIM card allocation request to the server; then, the server will call a V-SIM card from its own second V-SIM card database and allocate the V-SIM card to the mobile terminal. At this time, the mobile terminal also needs to continuously verify whether the V-SIM card allocated by the server may perform network registration successfully. After the data is stable, the information in the network information database may be updated again and pushed to the mobile terminal; in this way, when the mobile terminal searches the external network next time, a V-SIM card that matches with the external network may be called from the mobile terminal's own first V-SIM card database. In a use process of the mobile terminal, the aforesaid update mode is continuously performed, so that the integrity and the accuracy of the network information database are guaranteed.

In one preferable embodiment of the present disclosure, on the premise that the aforesaid V-SIM card that matches with the historical registration network in the network information database is ensured to be successfully registered in the network, the matching mode with the fastest network speed and the most stable network connection is selected, and thus the user experience may be improved. In another preferable embodiment of the present disclosure, the basic information of each historical registration network in the network information database further include charge information and the like, the matched V-SIM card may be a V-SIM card with the most reasonable charge on the basis of ensuring that network registration is normally performed, so that the user experience is further improved.

The method for calling SIM card provided by the embodiment of the present disclosure is applied in a mobile terminal which stores a network information database, the network information database includes network information generated according to the historical network connection data of the mobile terminal, when an external network is searched by the mobile terminal, which V-SIM card that matches with the external network currently may be determined according to the network information stored in the network information database, and the V-SIM card that matches with external network is directly called, in this way, a problem that time and network traffic are wasted because that V-SIM card allocation is requested by interacting with the server for many times and whether the network is successfully connected is verified for many times in the traditional SIM card calling mode is avoided. According to the method for calling SIM card provided by the embodiment of the present disclosure, due to the fact that which V-SIM card needs to be called is determined by the mobile terminal itself, the operations of continuously interacting with the server and continuously verifying the network are basically avoided, not only the networking time is greatly shortened, the network traffic is also saved, so that the user experience is greatly improved.

Embodiment Five

Figure 5:
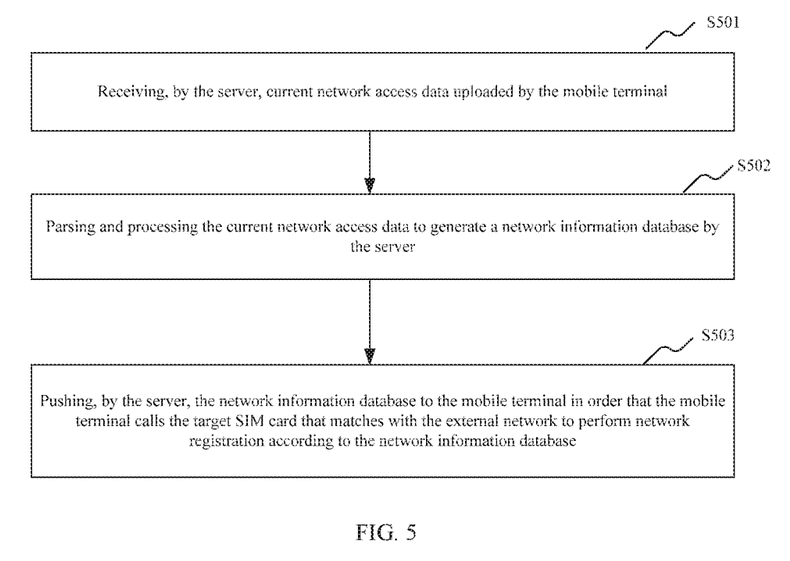
FIG. 5 depicts a schematic flow diagram of a method for pushing information performed on a server according to a fifth embodiment of the present disclosure.

FIG. 5 depicts a schematic flow diagram of a method for pushing information performed on a server according to embodiment five of the present disclosure, the method for pushing information includes:

step 501, receiving, by the server, current network access data uploaded by a mobile terminal;

step 502, parsing and processing the current network access data to generate a network information database by the server;

step 503, pushing, by the server, the network information database to the mobile terminal in order that the mobile terminal calls a target SIM card that matches with the external network according to the network information database to perform network registration.

In this embodiment of the present disclosure, the method for pushing information is applied in a server and is configured to receive, parse and process the historical registered network data uploaded by the mobile terminal in the embodiment one and the embodiment four so as to generate a network information database and push the network information database to the mobile terminal, the network information database serves as the basis of historical information from which the V-SIM card is called when an external network is searched by the mobile terminal. When a V-SIM card is found to be matched with the currently searched external network in the first V-SIM card database stored in the mobile terminal, the V-SIM card is directly called, if it fails to search a V-SIM card that matches with the currently searched external network in the first V-SIM card database stored in the mobile terminal, a SIM card allocation request is sent to the server, so that the V-SIM card that matches with the external network is called from the second V-SIM card database stored in the server.

For more details, please refer to the descriptions in the embodiment one and the embodiment four as mentioned above, it is not repeatedly described herein.

The method for pushing information provided by this embodiment of the present disclosure is applied in the server, the current network access data of the mobile terminal are parsed and processed by the server, and the network information database is pushed to the mobile terminal, so that the mobile terminal may determine which V-SIM card needs to be called according to the network information database when different networks are searched, historical registration network data of the mobile terminal is included in the network information database, the waste of network traffic and time caused by repetitiously performing the communication between the mobile terminal and the server are avoided, so that the V-SIM card with the most reasonable charge and the most stabilized network state may be acquired, the intelligence of the mobile terminal is greatly improved, and the user experience is greatly improved.

Embodiment Six

Figure 6:
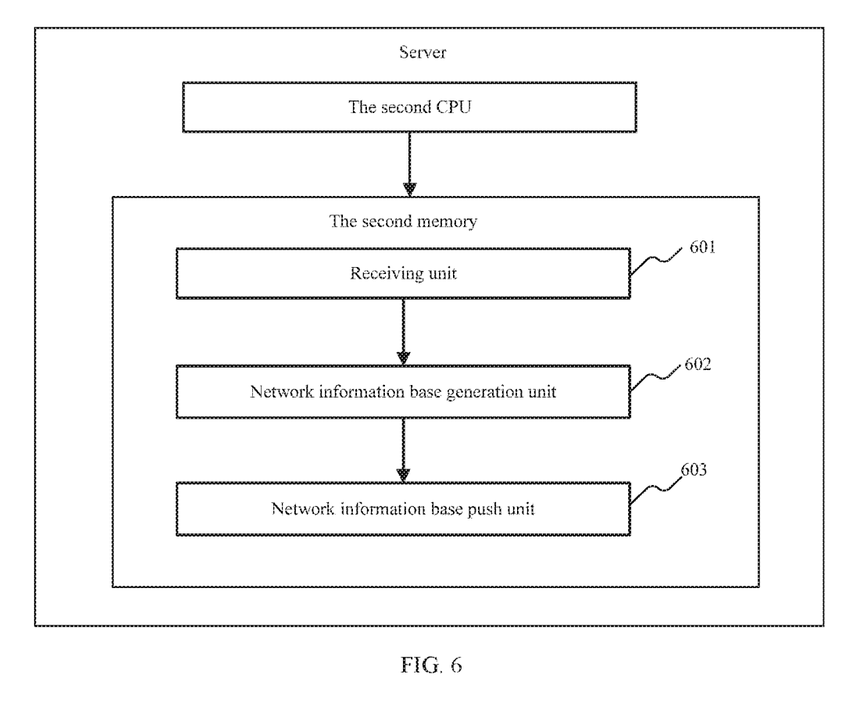
FIG. 6 depicts a schematic flow diagram of a server for pushing information according to a sixth embodiment six of the present disclosure.

FIG. 6 depicts a schematic structural diagram of a server 12 according to this embodiment of the present disclosure, the server 12 includes:

a second processor, which may be CPU, or be ASIC (Application Specific Integrated Circuit), or be one or a plurality of integrated circuits configured to implement the present disclosure; and a second memory configured to store computer program, the second memory may include a RAM, and may also include a non-volatile memory such as a magnetic disc storage.

Particularly, as shown in FIG. 6, the computer program may include:

a receiving unit 601, which is configured to receive current network access data uploaded by a mobile terminal;

a network information database generating unit 602, which is configured and to parse and process the current network access data so as to generate a network information database; and a network information push unit 603, which is configured to push the network information database to the mobile terminal in order that the mobile terminal calls a target SIM card that matches with the external network to perform network registration according to the network information database.

The second processor is configured to execute the computer program stored in the second memory to receive current network access data uploaded by a mobile terminal; and to parse and process the current network access data so as to generate a network information database; and to push the network information database to the mobile terminal in order that the mobile terminal calls a target SIM card that matches with the external network to perform network registration according to the network information database.

In this embodiment of the present disclosure, the device for pushing information is applied in a server, and is configured to receive, parse and process the historical registered network data uploaded by the mobile terminal in the embodiment one and the embodiment four so as to generate a network information database and push the network information database to the mobile terminal, the network information database serves as the basis of historical information from which the V-SIM card is called when an external network is searched by the mobile terminal. When a V-SIM card is found to be matched with the currently searched external network in the first V-SIM card database stored in the mobile terminal, the V-SIM card is directly called, if it fails to search a V-SIM card that matches with the currently searched external network in the first V-SIM card database stored in the mobile terminal, a SIM card allocation request is sent to the server, so that the V-SIM card that matches with the external network is called from the second V-SIM card database stored in the server.

For more details, please refer to the descriptions in the embodiment one and the embodiment four as mentioned above, it is not repeatedly described herein.

The device for pushing information provided by this embodiment of the present disclosure is applied in the server, the current network access data of the mobile terminal are parsed and processed by the server, and the network information database is pushed to the mobile terminal, so that the mobile terminal may determine which V-SIM card needs to be called according to the network information database when different networks are searched, historical registration network data of the mobile terminal is included in the network information database, the waste of network traffic and time caused by repetitive communications between the mobile terminal and the server are avoided, so that the V-SIM card with the most reasonable charge and the most stabilized network state may be acquired, the intelligence of the mobile terminal is greatly improved, and the user experience is greatly improved.

Embodiment Seven

Figure 7:
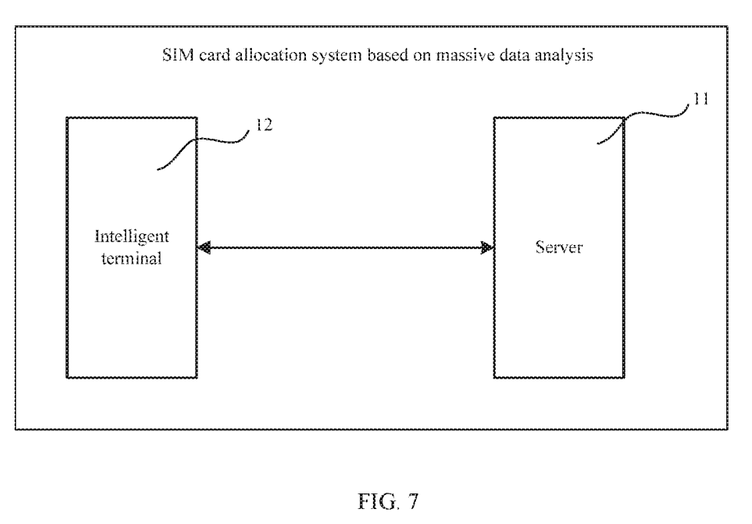
FIG. 7 depicts a schematic structural diagram of a SIM card allocation system based on massive data analysis provided by a seventh embodiment of the present disclosure.

FIG. 7 depicts a SIM card allocation system based on massive data analysis according to embodiment seven of the present disclosure, the SIM card allocation system includes:

an intelligent terminal 11 configured to parse a currently searched external network and generate a parsing result; to read a pre-stored network information database; and to call a target SIM card that matches with the external network to perform network registration according to the parsing result and the network information database; and a server 12 configured to receive current network access data uploaded by the intelligent terminal 11; and to parse and process the current network access data so as to generate a network information database and push the network information database to the intelligent terminal 11 in order that the intelligent terminal 11 calls the target SIM card that matches with the external network to perform network registration according to the network information database.

In the SIM card allocation system based on massive data analysis according to embodiment seven of the present disclosure, particularly, as described in embodiments one, embodiment two, embodiment three, embodiment four, embodiment five, and embodiment six of the present disclosure, the mobile terminal may call the soft-SM card that matches with the currently searched external network according to the first V-SIM card base and the network information database, not only frequent interactions between the intelligent terminal 11 and the server 12 is avoided, but also the V-SIM card with the most reasonable charge and most stabilized network state (e.g., the network speed is high, the stability of network connection is excellent, and the like) is guaranteed, and the user experience is greatly improved. Moreover, the SIM card allocation system based on massive data analysis may also update the network database according to the server 12 to guarantee the accuracy of the historical data, so that the SIM card called by the mobile terminal is ensured to be the one optimally matched with the currently searched external network, and the user experience is further improved.

Exemplarily, the computer program may be divided into one or a plurality of modules/units, the one or plurality of modules/units are stored in the first memory or in the second memory, and are executed by the first processor or the second processor to implement the present disclosure. The one or plurality of modules/units may be a series of computer program instruction segments for accomplishing particular functionalities, these instruction segments are used for describing an executive process of the computer program in the device for calling SIM card or the device for pushing information.

The so called first processor/second processor may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or alternatively, the processor can also be any conventional processor and so on.

In addition, the various functional units in each of the embodiments of the present disclosure may be integrated into a single processing unit, or exist individually and physically, or two or more than two units are integrated into a single unit. The aforesaid integrated unit can either be achieved by hardware, or be achieved in the form of software functional units.

If the integrated unit/module is achieved in the form of software functional unit, and is sold or used as an independent product, the integrated unit/module may be stored in a computer readable storage medium. Based on this understanding, a whole or part of flow process of implementing the method in the aforesaid embodiments of the present disclosure can also be accomplished by using computer program to instruct relevant hardware. When the computer program is executed by the processor, the steps in the various method embodiments described above may be implemented. Wherein, the computer program includes computer program codes, which may be in the form of source code, object code, executable documents or some intermediate form, etc. The computer readable medium may include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software allocation medium, etc. It needs to be explained that, the contents contained in the computer readable medium may be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are merely intended to explain but not to limit the technical solutions of the present disclosure. Although the present disclosure has been explained in detail with reference to the embodiments as mentioned above, it should be understood by the ordinary skilled one in the art that, the technical solutions described in each of the above-described embodiments can still be amended, or some technical features in the technical solutions may be replaced equivalently; these amendments or equivalent replacements, which won't make the essence of corresponding technical solution to be broken away from the spirit and the scope of the technical solution in various embodiments of the present disclosure, should all be included in the protection scope of the present disclosure.

What is claimed is:

1. A method performed on a mobile terminal for calling SIM card, comprising the steps of:
   parsing, by the mobile terminal, an external network as currently searched out by the mobile terminal and generating a parsing result by the mobile terminal;
   reading, by the mobile terminal, a network information database pre-stored in the mobile terminal; and
   calling, by the mobile terminal, a target SIM card that matches with the external network to perform network registration according to the parsing result and the network information database;
   wherein before the step of parsing, by the mobile terminal, an external network as currently searched out by the mobile terminal and generating a parsing result by the mobile terminal,
   uploading, by the mobile terminal, current network access data of the mobile terminal to a server, and receiving, by the mobile terminal, the network information database generated and allocated by the server according to analysis and processing of historical and the current network access data.

2. The method for calling SIM card according to claim 1, wherein the step of calling, by the mobile terminal, a target SIM card that matches with the external network to perform network registration according to the parsing result and the network information database particularly comprises a step of:
   calling, by the mobile terminal, the target SIM card that matches with the external network from a first V-SIM card database pre-stored in the mobile terminal or from a second V-SIM card database in a server to perform network registration, according to the parsing result and the network information database.

3. The method for calling SIM card according to claim 1, wherein the network information database is written into the mobile terminal in a manufacturing process of the mobile terminal.

4. The method for calling SIM card according to claim 2, wherein the parsing result is basic information of the external network and at least comprises frequency band information or frequency point information of the external network and position information corresponding to the external network.

5. The method for calling SIM card according to claim 4, wherein the network information database at least comprises basic information of one or a plurality of historical registration networks and a correspondence relationship between the one or plurality of historical registration networks and each SIM cards in the first V-SIM card database; and
   the basic information of the historical registration network at least comprises the frequency band or the frequency point information of the external network and the position information corresponding to the external network.

6. The method for calling SIM card according to claim 5, wherein the step of calling, by the mobile terminal, the target SIM card that matches with the external network from a first V-SIM card database pre-stored in the mobile terminal or from a second V-SIM card database in a server to perform network registration, according to the parsing result and the network information database particularly comprises steps of:
   determining, by the mobile terminal, whether there exists a historical registration network that matches with the basic information of the external network in the network information database;
   calling, by the mobile terminal, the target SIM card corresponding to the historical registration network that matches with the external network from the first V-SIM card database pre-stored in the mobile terminal according to the correspondence relationship between the historical registration network and each SIM card in the V-SIM card database so as to perform network registration, if it is determined that there exists a historical registration network that matches with the basic information of the external network in the network information database; or alternatively
   sending, by the mobile terminal, a SIM card allocation request to the server according to the parsing result, and receiving, by the mobile terminal, the target SIM card called and allocated by the server from the second V-SIM card database in response to the SIM card allocation request to perform network registration, if it is determined that there doesn't exist a historical registration network that matches with the basic information of the external network in the network information database.

7. The method for calling SIM card according to claim 6, wherein the step of determining, by the mobile terminal, whether there exists a historical registration network that matches with the basic information of the external network in the network information database particularly comprises:
   determining, by the mobile terminal, whether there exists the historical registration network that matches with one or any combination of the frequency band information and the frequency point information of the external network, and the position information corresponding to the external network in the network information database.

8. A method performed on a server for pushing information, comprising the steps of:
   receiving, by the server, current network access data uploaded by a mobile terminal;
   parsing and processing the current network access data to generate a network information database by the server; and
   pushing, by the server, the network information database to the mobile terminal in order that the mobile terminal calls a target SIM card that matches with the external network to perform network registration according to the network information database.

9. The method for pushing information according to claim 8, wherein the step of pushing, by the server, the network information database to the mobile terminal in order that the mobile terminal calls the target SIM card that matches with the external network to perform network registration according to the network information database particularly comprises:
   pushing, by the server, the network information database to the mobile terminal in order that the mobile terminal calls the target SIM card that matches with the external network from a first V-SIM card database pre-stored in the mobile terminal to perform network registration; or alternatively
   pushing, by the server, the network information database to the mobile terminal in order that the mobile terminal sends a SIM card allocation request to the server and calls the target SIM card that matches with the external network from a second V-SIM card database of the server to perform network registration in response to the SIM card allocation request.

10. A SIM card allocation system based on massive data analysis, comprising:
   an intelligent terminal configured to parse a currently searched external network and generate a parsing result; to read a network information database pre-stored in the intelligent terminal; and to call a target SIM card that matches with the external network to perform network registration according to the parsing result and the network information database; and
   a server configured to receive current network access data uploaded by the intelligent terminal; and to parse and process historical network access data and the current network access data so as to generate a network information database and push the network information database to the mobile terminal in order that the mobile terminal calls the target SIM card that matches with the external network to perform network registration according to the network information database.

* * * * *